Figure 1:
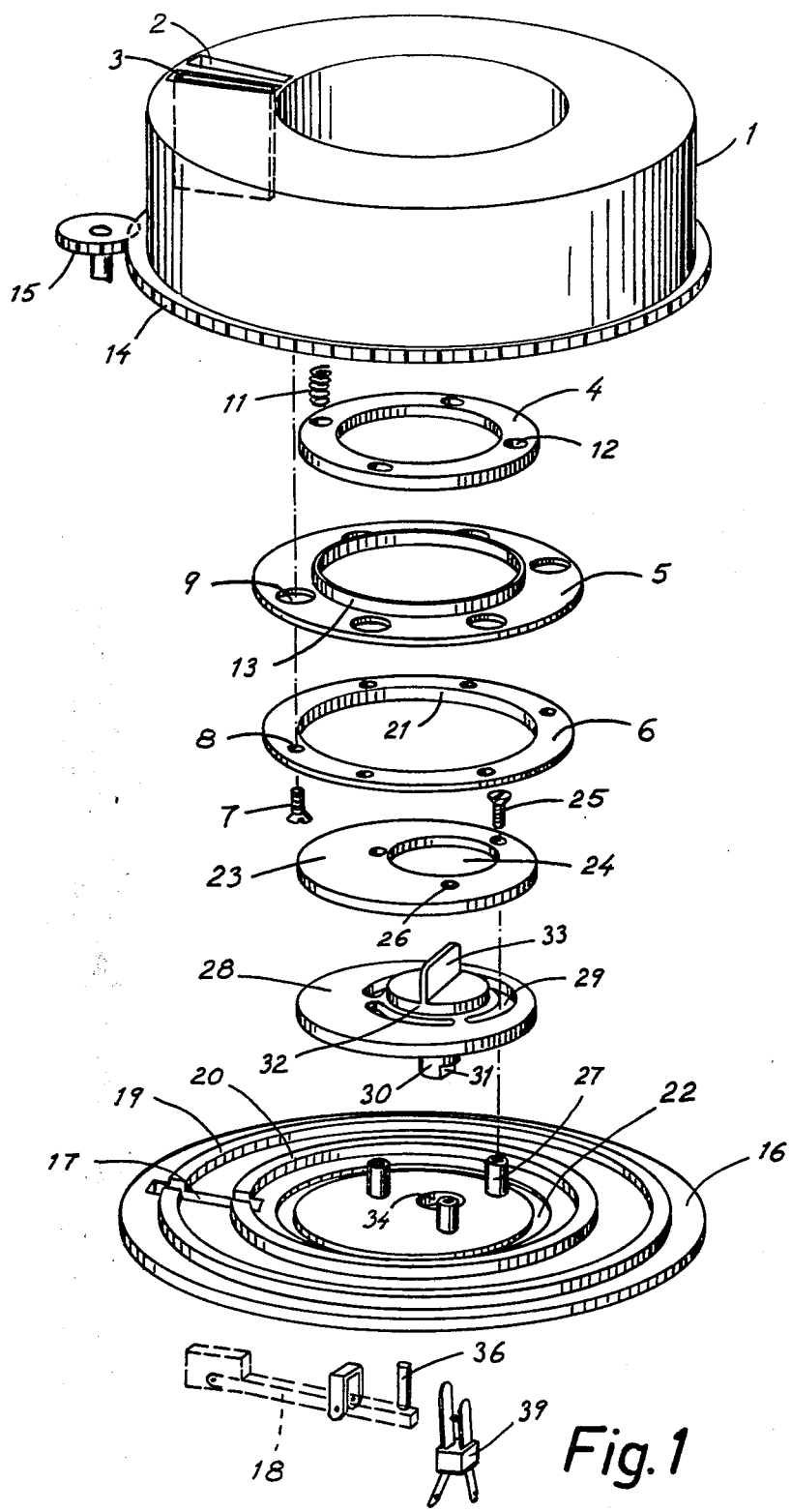

United States Patent [19]

Johansson et al.

[11] 4,418,997

[45] Dec. 6, 1983

[54] SLIDE PROJECTOR WITH CIRCULAR SLIDES MAGAZINE

[75] Inventors: Lennart R. Johansson, Landvetter; Ernst G. K. Hillström, Mölnlycke, both of Sweden

[73] Assignee: Victor Hasselblad Aktiebolag, Gothenburg, Sweden

[21] Appl. No.: 260,886

[22] Filed: May 6, 1981

[30] Foreign Application Priority Data

Jun. 6, 1980 [SE] Sweden ................. 8004260

[51] Int. Cl.³ .................................. G03B 23/06
[52] U.S. Cl. ................................. 353/111
[58] Field of Search ............. 353/103, 111, 115–117

[56] References Cited

U.S. PATENT DOCUMENTS 3,661,451 5/1972 Hall ........................... 353/117
3,781,103 12/1973 DiPietro ................. 353/117 X Primary Examiner—Harry N. Haroian
Attorney, Agent, or Firm—Sherman & Shalloway

[57] ABSTRACT

A slide projector for interchangeable circular slides magazines comprising downwardly open slide compartments (2) is provided with a mechanism, the double function of which is to lock the slide compartments and to release the slides magazine from the slide projector and, respectively, to release the slide frames (3) in the slide compartments (2) and to couple the slides magazine to the slide projector. The mechanism comprises an eccentric plate (28) which is located on the slide projector and upon rotation moves a locking ring (5) located in the slides magazine for the slide frames (3) at the same time as the eccentric device effects the coupling between the slide projector and the slides magazine. Mechanical (36) and electric (39) safety devices render slides magazine exchange prior to completed slide change impossible and, respectively, render slide change impossible while exchange of slides magazine is going on.

3 Claims, 6 Drawing Figures

SLIDE PROJECTOR WITH CIRCULAR SLIDES MAGAZINE

This invention relates to slide projectors, more precisely to such slide projectors, which are provided with interchangeable, circular, horizontally disposed slides magazines.

The invention relates to a circular slides magazine with downwardly open slides compartments provided with a common locking device for side frames and means for coupling the slides magazine to the slide.

Several circular slides magazines with downwardly open slides compartments for slide frames are known, which can be divided into two main groups, viz. such with, and such without magazine bottom. Slides magazines with magazine bottom carry the slide frames even when the slides magazine is attached to a slide projector for slide performance. The magazine bottom includes a slit, through which the slides at their performance are passed in and out. The slit is provided with an automatically operating closing device, which closes when the magazine is being lifted off, and opens when the magazine is being placed on the projector. The requirement of a movable magazine bottom with associated locking members per slide magazine renders these slides magazines relatively expensive. This is a disadvantage when considering that usually several slides magazines are procured for every projector, because they can be provided with a cover and utilized as storage boxes for completely drafted programs.

In slides magazines without magazines bottom the slide frames are standing on the upper plate of the slide projector while the performance is going on. The magazine bottom here is replaced by a locking device, which prevents the slide frames from dropping out when the slides magazine has been removed. When the slides magazine is being attached to the slide projector, the locking device is released automatically, and when the slides magazine is being removed, the locking device automatically is locked and thereby prevents the slides from dropping out. A device of this kind is disclosed in the SE-PS 406 983. The device operates well, but is complicated from a manufacturing point of view and, therefore, relatively expensive.

The present invention has the object of producing an interchangeable slides magazine without magazine bottom, which magazine is reliable in operation, easy to manufacture and use, and which yields low total costs in cases when several slides magazines are required for storing completely drafted slides programs.

According to the invention, the said objects are achieved by the steps defined in the characterizing clause of the main claim. The slide magazine proper with locking members mounted thereon and associated magazine cover constitute a few parts, which are simple to manufacture and mount. Hereby the desired low cost for the slides magazine is obtained, of which normally several copies per slide projector are sold. On the upper plate of the slide projector the members are located which are required for centering the slides magazine and for attaching it to and, respectively, removing it from the projector, which members simultaneously are used for automatically operating the locking members of the slides magazine for releasing and, respectively, locking the slide frames. Beneath and through the upper plate a pair of simple safety members connected to the slide changer mechanism of the slide projector are provided. Also these latter members, of which one set per slide projector is required, are simple to manufacture and mount. The slide projector according to the invention, therefore, has a slides magazine showing all aforesaid desired advantages.

Figure 2:
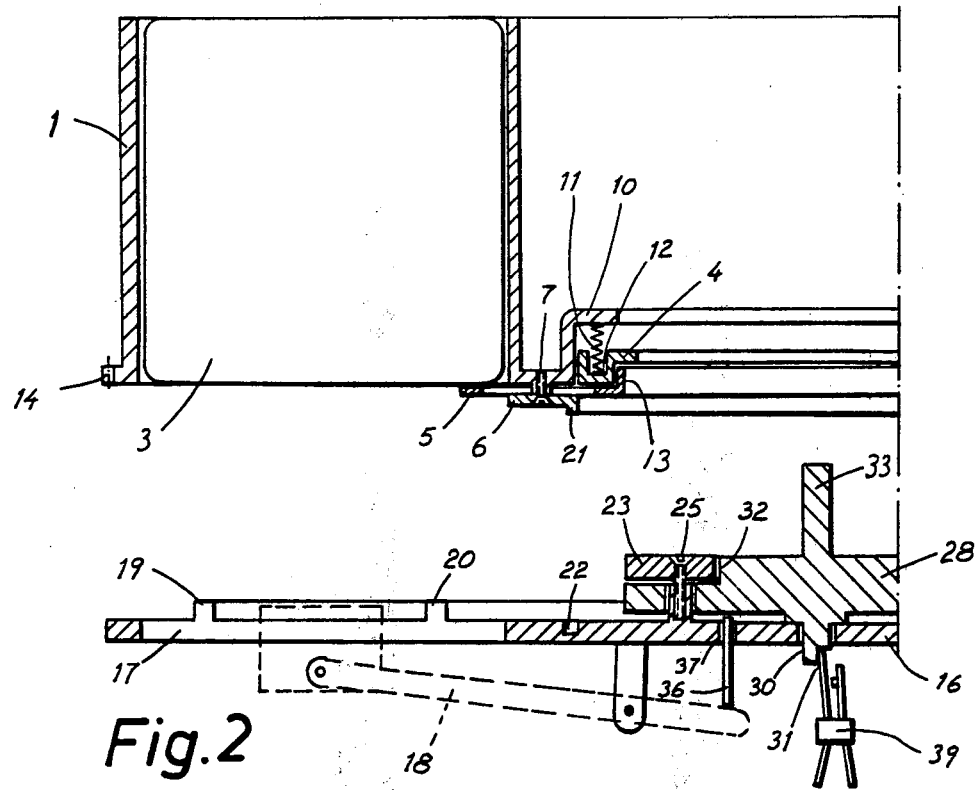
Figure 3:
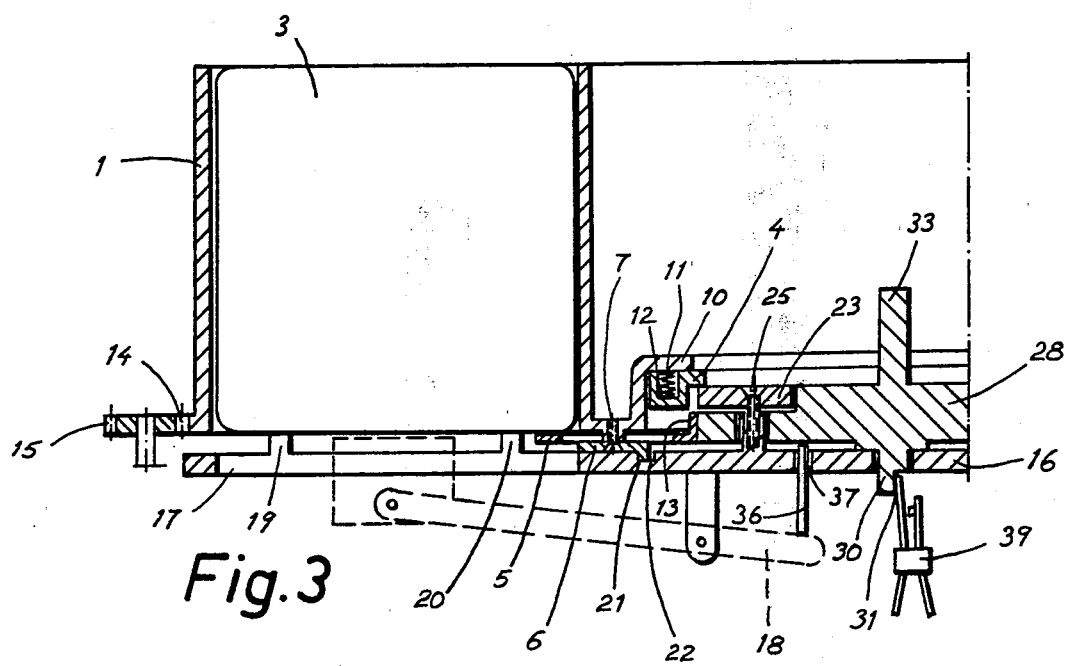
Figure 4:
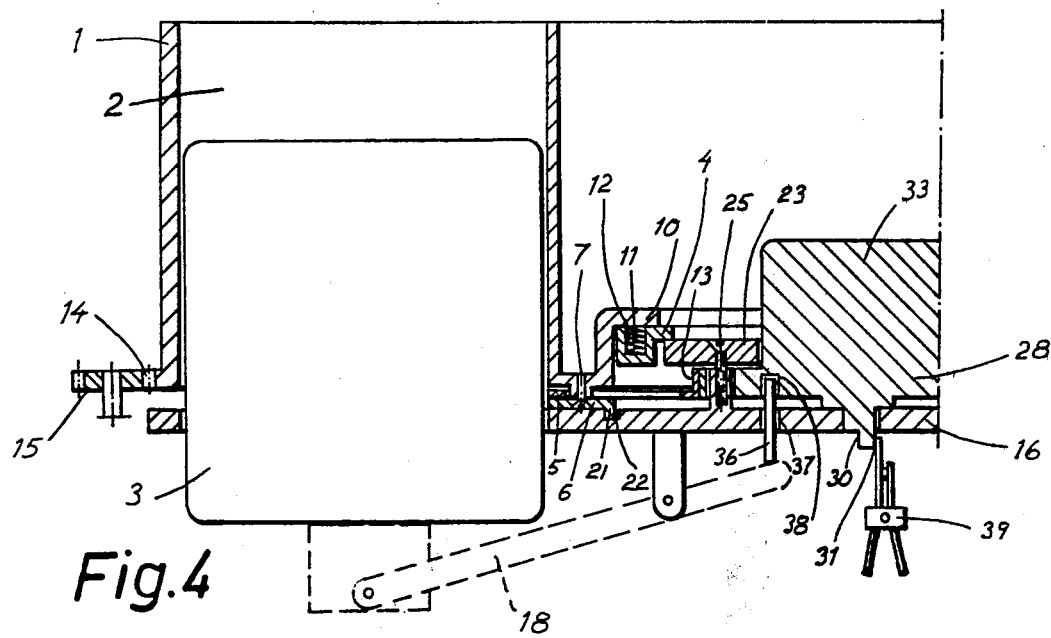
Figure 5:
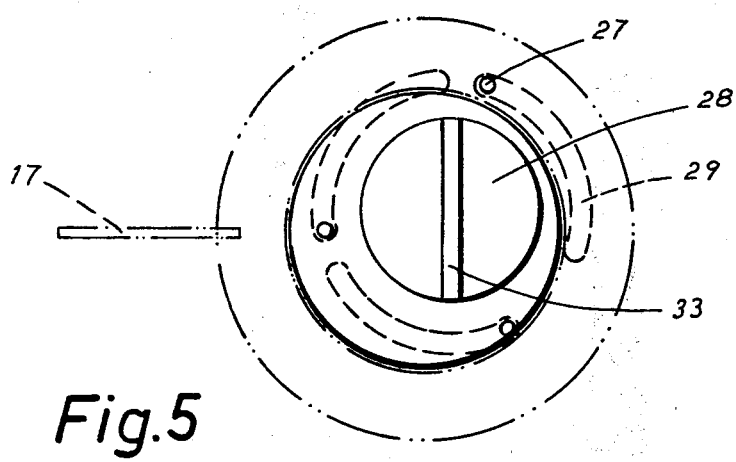
Figure 6:
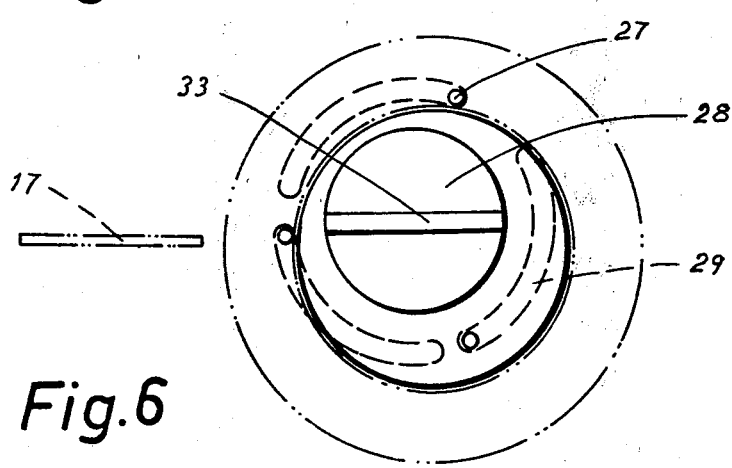

A preferred embodiment of the invention is described in greater detail in the following, with reference to the accompanying drawing, in which FIG. 1 is a perspective exploded view of a slides magazine with adjoining parts of a slide projector, FIG. 2 is a vertical partial section of the slide changing position of the device according to FIG. 1 while the slides magazine is being attached or removed, FIG. 3 shows the device according to FIG. 2 where the slides magazine is positioned on the slide projector but not attached thereto, FIG. 4 corresponds to FIG. 3, but shows the slides magazine attached to the slide projector, FIG. 5 is a view from above of the locking device of the slide projector for the slides magazine in open position corresponding to FIGS. 2 and 3, and FIG. 6 shows the same locking device in closed position corresponding to FIG. 4.

A slides magazine for a slide projector according to the invention as shown in FIG. 1 comprises a circular magazine frame 1, which includes a plurality of downwardly and upwardly open radial slide compartments 2 for slides mounted in slide frames 3. The magazine further comprises details mounted on the central lower portion of the magazine frame 1. FIGS. 1 and 2, for centering the slides magazine and coupling it to the slide projector. Said latter details are a centre ring 4, a locking ring 5 and a centering ring 6. Screws 7 through holes 8 and 9 in the centering ring 6 and, respectively, locking ring 5 secure said rings to the magazine frame 1, in such a manner, that the centre ring 4 is locked, but axially movable between the locking ring 5 and a supporting flange 10 on the magazine frame 1, FIG. 2. The centre ring 4 is held depressed by springs 11 between the supporting flange 10 and bottom holes 12 in the centre ring 4. In its lower end position, FIG. 2, the centre ring 4 projects below an upward directed flange 13 on the locking ring 5, which latter assumes a central position in relation to the magazine frame 1. The outer diameter of the locking ring 5 is chosen so that the locking ring 5 in the central position described projects a short distance beneath the slide frames 3 in the slide compartments 2, whereby the slides magazine can be lifted off and on the slide projector without the slide frames 3 dropping out. The magazine frame 1 further is provided with an external geared ring 14, which when the slides magazine is mounted engages with a pinion 15 comprised in the slide changer mechanism of the slide projector. When the slides magazine is used for storing slides therein, it is provided with a cover (not shown) of a design known per se. Such a cover, for example, may be attached and removed by means of a bayonet catch to the central portion of the magazine frame 1.

The afore-described slides magazine is mounted for slide performance on the upper plate 16 of the slide projector, FIG. 1. In the upper plate 16 a slide aperture 17 is located above the projection position of the slide projector. By means of a schematically shown slide control arm 18 comprised in the slide changer mechanism of the slide projector a slide frame 3 can be fetched in the slide compartment 2 located above the slide aperture 17 and be lowered to the projection position (not shown) and after completed performance be returned to the slide compartment 2, whereafter the slides magazine is advanced one step to the next slide compartment 2 by means of the pinion 15 and geared ring 14. The slide control arm 18, for reason of simplicity, is shown schematically and, of course, at the embodiment and dimensioning shown cannot carry out the entire required pivotal movement for lowering and lifting the slide frame to the end positions intended. The expert, however, should readily understand the function of the arm and safety device.

At slide performance, the slide frames 3 are free from the locking ring 5 in a manner described below and stand on two circular strips 19,20, on which they slide when the slides magazine at slide change is turned. For centering the slides magazine on the upper plate 16, the centering ring 6 is provided with a downward directed guide edge 21, which guides in a groove 22 in the upper plate 16. On the upper surface of the upper plate 16, inside of said groove 22 a control device is provided for attaching the slides magazine to the slide projector and for releasing the slide frames 3 from the slides magazine when a slides magazine is being mounted on the slide projector and, respectively, for releasing the slides magazine and locking the slide frames 3 when the slides magazine is removed from the slide projector. A centre disc 23 with an eccentrically located guide hole 24 is attached on the upper plate 16 by means of three screws 25, which extend through three holes 26 uniformly located about the guide hole 24 and through round distance sleeves 27 located between the centre disc 23 and the upper plate 16. An eccentric plate 28, FIG. 1, provided with three arc-shaped grooves 29 for the distance sleeves 27, a lower bearing pin 30 with a cam 31, an upper bearing surface 32 and a handle 33, is supported in the guide hole 24 between the centre disc 23 and the upper plate 16 where the bearing pin 30 is mounted in a hole 34. The grooves 29 and distance sleeves 27 render the eccentric plate 28 limited rotatable, through about one quarter of a revolution. The centre disc 23 and the eccentric plate 28 have the same outer diameter and cover each other completely when the eccentric plate 28 has been rotated to the outer position in clockwise direction, as shown in FIGS. 3 and 5, which is the position at which the slides magazine can be placed on and be removed from the slide projector. When the eccentric plate 28 is rotated counter-clockwise to the opposed outer position, the slides magazine is attached to the slide projector, FIGS. 4 and 6, in the manner described below.

A mechanic safety device for preventing any slide frame 3 from remaining in the slide projector at the exchange of a slides magazine is located beneath the upper plate 16. Said device consists of an axially movable locking pin 36, which is mounted in a hole 37 in the upper plate and senses the slide control arm 18, FIGS. 1-4. In the eccentric plate 28 a blind hole 38 is located for the locking pin 36 in the position, which corresponds to a slides magazine attached to the slide projector, FIG. 4.

An electric safety device for preventing unintentional slide change while exchange of slides magazines is going on also is provided beneath the upper plate 16. The device consists of a microswitch 39 conncted in series with the control circuit of the slide changer mechanism, which microswitch is controlled by the cam 31 on the eccentric plate 28, FIGS. 1-4.

When the slides magazine, FIG. 2, is free from the slide projector, the centre ring 4 is held depressed by the springs 11, whereby the flange 13 on the locking ring 5 engages about the inner edge of the centre ring 4. The locking ring 5 thereby will be concentric with the magazine frame 1, and the slide frames 3 remain standing on the outer edge of the locking ring 5. When the eccentric plate 28 as described above is rotated counter-clockwise, the slides magazine can be moved down over the centre disc 23, which thereby presses the spring-loaded centre ring 4 upward whereby the locking thereof by the locking ring 5 in centered position ceases. Upon rotating the eccentric plate 28 counter-clockwise to locked position, the eccentric plate 28 assumes its eccentric position relative to the centre disc 23, whereby the eccentric plate 28 so displaces the locking ring 5, that it assumes the position shown in FIGS. 4 and 6, in which position the slide aperture 17 is released. Said displacement is possible in that the holes 9 in the locking ring 5 have a substantially greater diameter than the screws 7. At the same time, the flange 13 of the locking ring 5 slides inward beneath the centre disc 23, FIG. 4, whereby the slides magazine is coupled to the slide projector. The locking ring 5 now is on a lower level than the upper edge of the strips 19,20, so that the slide frames 3 stand on the strips 19,20 except for the slide frame 3 which is above the slide aperture 17. This slide frame 3 remains standing on the slide control arm 18.

When the eccentric plate 28 is rotated to open position. FIGS. 2,3, the slide control arm 18 is arrested in its lifted position by the locking pin 36, because its axial movement upward is stopped by the eccentric plate 28. Thus, no slide change can occur at removed or released slides magazine. When the eccentric plate 28 is being rotated to closed position, FIG. 4, the hole 38 in the eccentric plate 28 will be located straight above the locking pin 36, which thereby can move a distance sufficiently long upward for rendering it possible for the slide control arm 18 to complete a slide change. When the locking pin 36 is in the hole 38, FIG. 4, it is not possible either to rotate the eccentric plate 28, and therefore the slides magazine can be removed from the slide projector first after the slide change has been completed, and all slide frames 3 have been returned to their respective slide compartments 2.

The cam 31 on the eccentric plate 28 closes the normally open microswitch 39 when the eccentric plate 28 is rotated to its counter-clockwise end position, where the slides magazine is coupled to the slide projector. It is thereby possible, by the slide change contact (not shown) of the slide projector to initiate a slide change. When the slides magazine is removed or not coupled, the microswitch 39 extends open and, therefore, no slide change operation can occur when by mistake or for some other reason the slide change contact will be touched.

When a slides magazine is to be removed from the slide projector, the eccentric plate 28 is rotated to its clockwise outer position, whereby the locking ring 5 returns to its centered position, FIGS. 2,3. This presupposes in the afore-described way that the slide change is completed, so that the locking pin 36 does not obstruct rotation of the eccentric plate 28. The slide frames 3 now are locked again, and the slides magazine is released and removable. The slide control arm 18, which after completed slide change is in its upper position shown in FIGS. 2 and 3, again is arrested by the locking pin 36. The microswitch 39 at the same time has broken the control circuit of the slide changer mechanism. Thereby all details again are in starting position.

What we claim is:

1. A slides magazine for use with a slide projector having a plurality of downwardly open compartments for the slides and means for coupling the slide magazine to the projector, the slide magazine comprising a circular frame having a centrally disposed opening to form an inner edge, a geared ring being provided in the outer periphery of the frame to engage a pinion for rotating the magazine, the inner edge being formed into a supporting flange, the frame having mounted thereto, in sequence: an axially movable center ring which is urged away from the circular frame by springs; a radially movable locking ring comprising an upwardly projecting flange along the inner periphery thereof for alignment with the center ring; a centering ring having a downwardly projecting guide edge along the inner periphery thereof; the slide projector having a top surface being provided with a slide aperture and a circular groove for engaging the guide edge in the centering ring in the slide magazine; a center disc having an eccentric guide hole being mounted on the top surface; an eccentric plate being disposed between the center disc and the top surface, the eccentric plate being rotatable between open and closed positions whereby in the closed position the eccentric ring moves radially the locking ring in the slide magazine to release the slide stored in the compartment above the slide aperture, the slide being held within the compartment by the outer edge of the locking ring when the eccentric ring is in an open position, the eccentric plate having a handle portion projecting through the eccentric guide hole in the center disc.

2. The slide magazine of claim 1 wherein the eccentric plate is further provided with a locking device comprising a locking pin for sensing the slide control arm in the projector, the locking pin being mounted axially in the upper plate and projecting upwardly into a hole in the eccentric plate.

3. The slide magazine of claim 1 or 2 wherein an electric safety device is coupled to the control circuit of the slide projector for preventing slide change when the slide magazine is not coupled to the upper plate, the safety device comprising a switch controlled by a cam formed on the eccentric plate.

* * * * *